United States Patent [19]
Chabardes et al.

[11] 3,920,751
[45] Nov. 18, 1975

[54] PROCESS FOR THE PREPARATION OF ETHYLENIC CARBONYL COMPOUNDS

[75] Inventors: Pierre Chabardes; Yvon Querou, both of Lyon, France

[73] Assignee: Rhone-Poulenc, Paris, France

[22] Filed: Dec. 16, 1971

[21] Appl. No.: 208,917

Related U.S. Application Data

[63] Continuation of Ser. No. 779,633, Nov. 27, 1968, abandoned.

[52] U.S. Cl. ............ 260/601 R; 260/598; 260/599; 260/601 H; 260/602; 260/593 R; 260/586 R; 260/479 R; 260/488 R
[51] Int. Cl.² ......................................... C07C 47/20
[58] Field of Search ..... 260/598, 599, 601 RF, 601, 260/600, 601 H, 602, 593 R, 586 R, 488 R, 479 R

[56] References Cited
UNITED STATES PATENTS

| | | | |
|---|---|---|---|
| 1,670,825 | 4/1928 | Rupe | 260/598 |
| 2,524,865 | 10/1950 | Winslow | 260/603 R |
| 3,189,655 | 6/1965 | Thompson | 260/601 |
| 3,236,869 | 2/1966 | Thompson | 260/601 R |

FOREIGN PATENTS OR APPLICATIONS

| | | | |
|---|---|---|---|
| 1,554,805 | 12/1968 | France | 260/601 R |

OTHER PUBLICATIONS

Bergmann, E. D., Jacs, Vol. 73, pp. 1218–1220, 1951.

*Primary Examiner*—Bernard Helfin
*Assistant Examiner*—R. H. Liles
*Attorney, Agent, or Firm*—Cushman, Darby & Cushman

[57] ABSTRACT

β-Acetylenic alcohols are isomerised to ethylenic carbonyl compounds by heating with a catalyst based on a metal of Groups Vb, VIb, or VIIb of the Periodic Table.

22 Claims, No Drawings

PROCESS FOR THE PREPARATION OF ETHYLENIC CARBONYL COMPOUNDS

This is a continuation of application Ser. No. 779,633 filed Nov. 27, 1968, and now abandoned.

The present invention relates to the preparation of carbonyl compounds by isomerisation of α-acetylenic alcohols.

It is known to isomerise arylalkynylcarbinols and their vinylogues in an acid medium to give ethylonic carbonyl compounds [Meyer et al., Ber. 55 819–23 (1922); Badoohe, Bull. Soc. Chim. Fr. (4) 43 340 (1928); MacGregor, J. Amor Chem. Soc. 70 3953 (1948); Hagihare, Chem. Abs. 45 8997g (1951); Clapperton et al. J. Amer Chem. Soc. 72 2501-2 (1950)]. It is also known to subject acetylenic alcohols of formula:

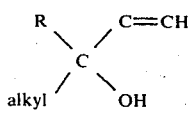

in which R represents a hydrogen atom or an alkyl or aryl radical, in the vapour phase to the action of a catalyst (U.S. Pat. Spec. Nos. 2,524,865 and 2,524,866; Bergmann, J. Amer Chem. Soc. 73 1218–20 (1951)) to prepare mixtures of unsaturated aldehydes, unsaturated ketones and ethylenic/acetylonic hydrocarbons.

The use of aoid media in the liquid phase for the isomerisation of acetylonic alcohols suffers from various disadvantages on an industrial scale and in particular the following:

a. The separation of the reaction products generally requires neutralisation of the reaction medium; this neutralisation results on the one hand in the loss of the acid employed and on the other hand in the formation of a salt of the acid in large amounts in the medium;

b. The reaction medium is corrosive in character;

c. By-products of the reaction form as a result of the hydration of the triple bond of the acetylonic alcohol employed;

d. In certain cases, by-products of the reaction also form through addition of acid to the double or triple bonds of the reagents and products of the reaction, and e. Where the carbonyl compound resulting from the isomerisation of the acetylonic alcohol is an aldehyde, this aldehyde is, in an acid medium, at least partially consumed by condensation (principally dimerisation and trimerisation) reactions or, in certain cases, by cyclisation reactions.

In the particular case of the conversion of dehydrolinalool (3,7-dimethyl-oct-6-en-1-yn-3-ol) to citral (3,7-dimothyl-octadion-2,6-al), the combination of these disadvantages has led to the choice of a process which consists of first preparing dehydrolinalyl acetate, isomerising this alkyl acetate to an allonic acetate in the presence of a silver or copper salt, and saponifying this allonic acetate [Saucy et al., Helv. Chim. Aeta 42 (6) 1945-55 (1959)].

The present invention provides a process for the single-stage catalytic isomerisation of acetylenic alcohols to ethylenic carbonyl compounds which does not suffer from the abovementioned disadvantages. The new process comprises heating an acetylenic alcohol of the formula:

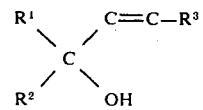

in which $R^1$, $R^2$ and $R^3$, which may be identical or different, represent hydrogen, or saturated or unsaturated aliphatic or cycloaliphatic radicals or aromatic or arylaliphatic raidcals, either substituted or unsubstituted, and $R^1$ and $R^2$ are optionally linked together in the liquid phase in the presence of a catalyst based on a transition metal belonging to sub-groups Vb, VIb, or VIIb of the Periodic Table of Mondeleef (published in the Handbook of Chemistry and Physics, 45th. edition, page B-2). Examples of substituents which may be present in $R^1$, $R^2$ and $R^3$ are halogen atoms and hydroxyl, alkoxy, acyl or acyloxy radicals.

Preferably $R^1$, $R^2$ and $R^3$ contain a total of 3 to 30 carbon atoms, and at least one of the radicals $R^1$ and $R^2$ is a saturated or unsaturated, substituted or unsubstituted alkyl radical of 1 to 15 carbon atoms. Still more preferably $R^1$ is an unsubstituted acyclic aliphatic radical of up to 12 carbon atoms which is saturated or contains one or two double bonds, $R^2$ is alkyl of up to 6 carbon atoms, or $R^1$ and $R^2$ together represent a divalent aliphatic radical of 3 to 12 carbon atoms which is saturated or contains one or two double bonds and make with the carbon atom to which they are attached a 5 or 6 membered carbocyclic ring, and $R^3$ is hydrogen, alkyl of up to 6 carbon atoms, or phenyl. A particularly interesting class of alcohol consists of alcohols of formula I in which $R^3$ represents a hydrogen atom.

The ethylenic carbonyl compounds prepared by isomerisation of the alcohols of formula I are generally a-ethylenic carbonyl compounds of formula:

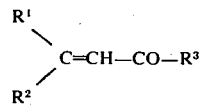

in which $R^1$, $R^2$ and $R^3$ are as defined above. However in the case where $R^1$ and $R^2$ together constitute a divalent radical, such as an optionally substituted pentamethylene radical, a β-ethylenic carbonyl compound having an intracyclic double bond also forms.

The catalysts which can be used in the process of the invention are essentially inorganic or organic derivatives of the aforesaid class of transition motals, and preforably of vanadium, niobium, molybdenum, tungsten or rhenium. The following may especially be quoted as examples of such derivatives: the halides, chalcogenides, chalcohalides, nitrosohalorides and nitrosylhalides; the salts of oxygen-containing inorganic acids such as the sulphates, nitrates, phosphates, carbonates, arsonates, arsenatos, germanates, perchlorates, sulphites and nitrites; mixed salts of the said transition metals with other metals; salts of aliphatic, cycloaliphatic or aromatic organic acids such as acetates, propionates, stearates, benzoates, oxalates, sucoinates, sulphonates, tartrates, citrates, salicylates and naphthenates; and the alcoholates and phenates. These salts, alcoholates and phenates may also be salts of oxygen-containing metal radicals such as vanadyl and molybdenyl salts.

Other suitable inorganic or organic derivatives of the above-mentioned metals are the salts and esters of acids derived from one or more of these metals such as vanadates, niobates, tantalates, molybdates, tungstates and rhenates; the analogous compounds in the per-, poly-, ortho-, meta-, pyro-, thio and halogeno- form; the mixed salts and esters such as the tungstovanadates, phosphomolybdates, tartratoniobates, zirconitungstates and molybdo-citrates, -formates, -lactates, -maleates, -mandelates, -muconates, -oxalates, -quinates, -saccharates, -tartramates, -tartrates and -tungstates. Chelates such as the acetylacetonates, optionally substituted by, for example, aliphatic or cycloaliphatic groups or by halogen atoms, are also suitable, as are benzoylacetonates, glyoximates, quinoleinates, salicylaldehydates, benzylhydroxamates, and derivatives of ethylene diamine, $\alpha,\alpha'$-dipyridyl, o-nitrosophenol, $\beta$-nitrosonaphthol, salicylaldimidine, naphtholdimidine and porphyrines. It is also possible to use the complexes of the metals or metal salts with co-ordination compounds such as for example carbon monoxide, monoolefines, diolefines, polyolefines, acetylenic compounds, cyclopentyldienyl, ammonia, cyanides, tertiary nitrogen-containing bases, phosphines, arsines, stibines and nitriles. Organometallic compounds such as the metal alkyls can also be used.

A particularly suitable class of catalyst for carrying out the invention consists of products containing a group of one of the following formulae:

in which M represents the metal atom, which can furthermore be bonded to other atoms by one or more ionic or covalent bonds. To this class of catalysts belong the metal oxides, metal salts, esters of oxyacids derived from the metals, salts of oxygen-containing metal ions, and chelates such as those derived from $\beta$-diketones. Ammonium vanadates, vanadyl salts, and lower alkyl orthovanadates are especially useful.

The metal derivative which constitutes the catalyst may be deposited on a carrier. The following are, for example, usable carriers: activated alumina and silica, pumice, Fuller's earth, diatomaceous earth and active charcoal.

The amount of metal present in the catalyst based on the weight of the reaction mixture is usually greater than 0.0001 % and preferably from 0.05 to 2 %. Greater quantities of catalyst can of course be used but without major additional advantage.

The catalyst may be soluble or insoluble in the reaction medium. It can also be combined with small quantities of a co-catalyst or activator. Suitable such co-catalysts include alcohols, Lewis bases such as ammonia, amines, phosphines, arsines, stibines, bismuthines and compounds capable of liberating a Lewis base under the reaction conditions, for example ammonium salts. An excess of co-catalyst sometimes interferes with good yields being obtained. The optimum amount of co-catalyst depends on the nature of the co-catalyst and of the catalyst. It can be found by simple routine experiment for any given combination of catalyst and co-catalyst.

The process may be carried out in the presence or absence of a solvent. Compounds which are chemically inert towards the catalyst and the reagents are generally used as the solvent. Chlorinated or unchlorinated aliphatic, alicyclic or aromatic hydrocarbons, ethers and amides are particularly suitable.

When a sufficiontly volatile acetylenic alcohol is isomerised in the presence of a solvent, this alcohol can be introduced in the gaseous form into a liquid reaction medium heated to the selected temperature for carrying out the reaction, with the said liquid medium initially containing principally the solvent and the catalyst.

To keep the temperature constant it is then possible to carry out a distillation at the rate at which the reaction products are formed.

The reaction temperature is generally from 50° to 250°C, and preferably from 100° to 200°C. The presence of a triple bond requires the usual precautions for acetylenic compounds. It is preferable not to work at too high a temperature.

The pressure at which the reaction is carried out is not critical.

The process of the invention can be carried out continuously or discontinuously. At the end of the reaction the catalyst can in general be recovered and re-used for fresh isomerisation operations.

At the end of the reaction it is also possible to isolate the resulting ethylenic carbonyl compound by methods known per se, for example by distillation or, in the case of aldehydes, via a sulphitnor bisulphite addition compound. For certain applications it is not necessary to isolate the ethylenic carbonyl compound and the total products contained in the reaction medium can be directly employed. This is especially the case for the preparation of ionones from citral, produced by the process of the invention from dehydrolinalool.

The $\alpha$-$\beta$-ethylenic carbonyl compounds obtained according to the present invention are important intermediates in organic synthesis. They are useful in the synthesis of natural occuring products such as vitamines. The are also useful for perfume compositions. The examples which follow show how the invention may be carried out.

EXAMPLE 1

Preparation of the Catalyst

Cyclohexyl orthovanadate is prepared from ammonium matavanadate and cyclohexanol according to the method described by Carton et al. (J. Phys. Chem. 64 1756 (1960)). The reagents are heated to the reflux temperature of the cyclohexanol, and water and ammonia are removed at the rate at which they are formed. The reaction mixture is cooled and filtered. The cyclohexanol is removed by distilling the filtrate under reduced pressure and the cyclohexyl ester is collected as a distillation residue.

Isomerisation

A mixture of 20 g. of dehydrolinalool, 1 g. of cyclohexyl orthovanadate and 100 cm³ of Vaseline oil (a mixture of hydrocarbons having a density at 15°C. of 0.855, a flash point of 180°C. and an Engler viscosity index of about 5 at 20°C. "Vaseline" is a Registered Trade Mark) is heated for 1 hour at 140°C. in a dry atmosphere. The reaction mixture is distilled and 20.3 g. of a fraction containing 6.09 g. of citral are collected. The yield based on dehydrolinalool converted is 81%, and the degree of conversion is 37%.

EXAMPLE 2

300 g. of dehydrolinalool, 1.5 g. of ammonium metavanadate (a product commercially sold by Prolabo), 15 g. of cyclohexanol and 630 g. of the Vaseline oil defined in Example 1 are introduced into a 2-liter flask fitted with a stirrer unit, a dip tube and a distillation column. Nitrogen is bubbled into the reaction medium at the rate of 18 liters/hour so as to remove the greater part of the ammonia formed by sweeping it away. The mixture is heated for 4 hours at 150°C. On distillation, 305.5 g. of a fraction boiling between 45° and 60°C. under 0.2 mm. Hg. and containing 77 g. of citral and 188.4 g. of dehydrolinalool are collected. The degree of conversion is 37%, and the yield of citral based on dehydrolinalool converted is 69%.

The citral content of the mixture is enriched by rectification. A fresh mixture consisting of citral (64.7% by weight) and dehydrolinalool is obtained. This enriched mixture can be used as such (without isolating the citral) in the preparation of ionones, as follows:

Pseudo-ionone 100 g. of the enriched mixture of dehydrolinalool/citral, 443 g. of acetone, 134 g. of water and 3.67 g. of sodium hydroxide in pellets are introduced into a 2-liter flask. The mixture is heated for 4 hours at 40°C. with stirring, and then cooled and neutralized with acetic acid. It is diluted with 200 cm³ of water, and the organic layer is separated and diluted with 200 cm³ of diethyl ether. The aqueous layer is three times extracted with 200 cm³ of diethyl ether and the ether fractions are combined, dried over $Na_2SO_4$, and filtered. On distillation, 67.85 g. of a fraction boiling between 90° and 100°C. under 0.2 mm. Hg. and containing 60.6 g. of pseudo-ionone are collected (yield based on citral converted is 74%).

β-Ionone 30.g. of ethyl acetate are run into 180 g. of sulphuric acid (66° Baume) cooled to 0°C., over the course of 25 minutes, followed by 60.3 g. of the pseudo-ionone prepared in the preceding paragraph added over the course of 55 minutes, the temperature being kept throughout at 0°C. The temperature is kept at 0°C. for a further 15 minutes. The reaction mixture is run into a mixture of 500 g. of water and ice with 50 cm³ of diethyl ether. The organic layer is separated. The aqueous layer is washed with 2 × 100 cm³ of diethyl ether. The ether fractions are combined, and washed successively with 100 cm³ of N sodium hydroxide solution, 100 cm³ of 10% strength by weight aqueous solution of NaCl, and 100 cm³ of a 5% strength by weight aqueous solution of $NaHCO_3$. The ether solution is dried over $Na_2SO_4$, and evaporated. On distillation, 50.34 g. of β-ionone are collected (yield based on pseudo-ionone converted is 93%).

EXAMPLE 3

Preparation of the Catalyst n-Propyl orthovanadate is prepared from $V_2O_5$ and an excess of n-propanol by boiling under reflux. The mixture is filtered, the water formed and the unreacted propanol are evaporated from the filtrate, and the vanadium ester is distilled.

Isomerisation

A mixture of 17.3 g. of dehydrolinalool and 0.4 g. of n-propyl orthovanadate is heated in a flask fitted with a stirrer and a condenser, in a dry atmosphere at 125°C. for 1 hour 30 minutes. The reaction mixture is distilled in vacuo. 16.4 g. of a fraction boiling between 51° and 70°C. under 0.2 mm. Hg. are collected. This fraction contains 2.79 g. of citral. The yield of citral based on dehydrolinalool converted is 75%, and the degree of conversion is 21%.

EXAMPLE 4

20 g. of dehydrolinalool and 0.4 g. of the catalyst of Example 3 are introduced into a flask fitted with a stirrer unit and a condenser. The reaction mixture is heated to 130°C. in a dry atmosphere for 1 hour 30 minutes and distilled. 18.9 g. of a fraction boiling between 45° and 60°C, under 0.2 mm. Hg. are collected. 20 g. of dehydrolinalool are added to the distillation residue and the mixture heated to 130°C. for 1 hour 40 minutes. The mixture is distilled in vacuo and 19.2 g. of a fraction boiling between 45° and 55°C. under 0.2 mm. Hg. are collected. 20 g. of dehydrolinalool are added to the distillation residue and the mixture is heated for 2 hours at 130°C. On distillation, 19.5 g. of a fraction consisting of dehydrolinalool and citral, as before, are obtained. In total, 8 g. of citral (measured by vapour phase chromatography) are obtained in the 3 fractions. The yield based on dehydrolinalool converted is 77%, and the degree of conversion is 17%.

EXAMPLE 5

Preparation of the Catalyst t-Butyl orthovanadate is prepared from tertiary butanol and $V_2O_5$ according to the method of Orlov et al. (Izv. Akad. Nauk. SSSR, Otdel. Khim. Nauk, 933–4 (1959)).

Isomerisation

A mixture of 4.35 g. of dehydrolinalool and 0.10 g. of t-butyl orthovanadate is heated in a flask fitted with a stirrer unit and a condenser to 130°C. for 1 hour 30 minutes in a dry atmosphere. The reaction mixture is distilled in vacuo. 3.75 g. of a fraction boiling between 40° and 60°C. under 0.2 mm. Hg. are collected. This fraction contains 0.68 g. of citral. The yield of citral based on dehydrolinalool converted is 53%, and the degree of conversion is 29%.

EXAMPLE 6

Preparation of the Catalyst

Isobutyl orthovanadate is prepared from isobutanol and $V_2O_5$ by the method described in Example 5.

Isomerisation 20 g. of dehydrolinalool and 0.8 cm³ of catalyst are introduced under a dry atmosphere into a 50 cm³ flask fitted with a condenser. The mixture is heated to 130°C. with stirring for 30 minutes, cooled, filtered, and the filtrate subjected to distillation. 18.5 g. of a fraction boiling between 52° and 80°C. under 1 mm. Hg. are collected. This fraction contains 3.05 g. of citral. The yield of citral based on dehydrolinalool converted is 67%. The degree of conversion is 22%.

EXAMPLE 7

300 g. of dehydrolinalool, 1.5 g. of ammonium metavanadate (commercial product), 1.5 g. of cyclohexanol and 630 g. of Vaseline oil (defined in Example 1) are introduced into a 2-liter flask fitted with a stirrer, a dip tube and a reflux condenser. Nitrogen is bubbled through at the rate of 18 liters/hour to remove the greater part of the ammonia formed and the mixture is heated to 160°C. for 1 hour 30 minutes. On distillation, 303.7 g. of a fraction boiling between 40° and 90°C. under 0.15 mm. Hg. and containing about 53 g. of citral are collected.

The isolation of the citral is then carried out. 217.62 g. of $Na_2SO_3.7H_2O$, 76.90 g. of $NaHCO_3$, 520 g. of ice water, and 303.19 g. of the dehydrolinalool/citral mixture obtained in the preceding operations are introduced into a 2-liter flask fitted with a stirrer unit. The mixture is stirred at ambient temperature for 12 hours, decanted, and the aqueous layer extracted with diethyl ether (3 × 100 cm³ and then once with 200 cm³). The organic layer is combined with these various other ether and dried over $Na_2SO_4$. The mixture is filtered and the ether removed. 245.6 g. of a mixture containing 211.2 g. of dehydrolinalool are obtained.

The aqueous layer containing the sulphite compound of the citral is placed in a 2-liter flask to which 420 g. of water and ice and 190 cm³ of diethyl ether are also added. The mixture is stirred to obtain a fine emulsion. 220 cm³ of 10 N sodium hydroxide are also added and the mixture left stirring for 15 minutes. The mixture is decanted and an organic layer A and an aqueous layer B are obtained. The aqueous layer B is washed with 3 × 100 cm³ of diethyl ether. These ether solutions are combined and in turn washed with 3 × 100 cm³ of water. These 3 ether solutions which have been washed with water are combined with the organic layer A and dried over $Na_2SO_4$. The ether is distilled, and the citral then distilled in vacuo. 45.9 g. of a fraction boiling between 68° and 72°C., under 1.5 mm. Hg. and consisting of pure citral are thus collected. The yield of citral based on dehydrolinalool converted is 52%. The degree of conversion is 29%.

EXAMPLE 8

Preparation of the Catalyst t-Amyl orthovanadate is prepared from t-amyl alcohol and $V_2O_5$ according to the method of Example 5.

Isomerisation

A mixture of 4.35 g. of dehydrolinalool and 0.10 g. of the vanadium ester is heated in a flask fitted with a stirrer and a condenser at 130°C. for 2 hours in a dry atmosphere. The reaction mixture is distilled in vacuo. 3.58 g. of a distillate containing 0.70 g. of citral are collected. The yield of citral based on dehydrolinalool converted is 47%. The degree of conversion is 34%.

EXAMPLE 9

Preparation of the Catalyst n-Amyl orthovanadate is prepared from n-amyl alcohol and $V_2O_5$ according to the method of Example 5.

Isomerisation

A mixture of 4.35 g. of dehydrolinalool and 0.10 g. of vanadium ester is heated in a flask fitted with a stirrer and a condenser at 125°-130°C. for 3 hours 40 minutes in a dry atmosphere. The reaction mixture is distilled in vacuo. 3.60 g. of a fraction boiling between 40° and 70°C. under 0.15 mm. Hg. are collected. This fraction contains 0.75 g. of citral. The yield of citral based on dehydrolinalool converted is 50%, and the degree of conversion is 34%.

EXAMPLE 10

Preparation of the Catalyst

Ethyl orthovanadate is prepared by reaction of ethanol with $V_2O_5$ by the method of Prandtl et al. (Z. Anorg. Allg. Chem. 82 117 (1913)).

This ethyl ester is transesterified to give the dehydrolinalyl ester in the following manner. 2.92 g. of ethyl orthovanadate are reacted with 6.57 g. of dehydrolinalool in 25 cm³ of benzene for 4 hours at ambient temperature. The benzene and the ethanol formed are removed by distillation in vacuo at ambient temperature. The resulting ester is kept with exclusion of air and moisture.

Isomerisation

A mixture of 20 g. of dehydrolinalool and 1.3 g. of dehydrolinalyl orthovanadate is heated for 1 hour at 140°C. in a dry atmosphere. The reaction mixture is distilled and 18.2 g. of a fraction boiling between 40° and 50°C. under 0.5 mm. Hg. and containing 4.0 g. of citral are collected. The yield of citral based on dehydrolinalool converted is 60%, and the degree of conversion is 33%.

EXAMPLE 11

20 g. of dehydrolinalool, 0.100 g. of ammonium metavanadate (a product sold commercially by Prolabo), 1 g. of cyclohexanol, and 50 cm³ of the Vaseline oil defined in Example 1 are introduced into a 150 cm³ flask fitted with a stirrer, a thermometer and a Vigreux column. Nitrogen is bubbled through at a rate of 2 liters/hour to remove the greater part of the ammonia formed. The mixture is heated for 1 hour at 160° and filtered at 80°C. to remove a slight precipitate. The filtrate is distilled under 0.2 mm. Hg. 19.85 g. of a fraction containing 3.58 g. of citral are collected.

20 g. of dehydrolinalool are added to the distillation residue. The mixture is heated to 160°C. for 30 minutes in an air atmosphere and distilled. A series of 9 recycling sequences is then carried out, representing a total of 10 isomerisation processes using 20 g. of dehydrolinalool each time. 32.6 g. of citral are obtained in all. The yield of citral based on dehydrolinalool converted is 76%, and the degree of conversion is 21%.

EXAMPLE 12

Preparation of the Catalyst

Ammonium hexavanadate is prepared by heating ammonium metavanadate to 85°C. in dilute aqueous hydrochloric acid by the method of Kelmers (J. Inorg. Nucl. Chem. 21 45–48 (1961)).

Isomerisation

A mixture of 20 g. of dehydrolinalool, 0.084 g. of ammonium hexavanadate and 1 g. of cyclohexanol is heated to 160°C. for 2 hours 10 minutes. On distilling the reaction mixture under 0.3 mm. Hg., 19.95 g. of a fraction boiling between 40° and 60°C. and containing 2.27 g. of citral are collected. The yield based on dehydrolinalool converted is 22%, and the degree of conver-

EXAMPLE 13

Preparation of the Catalyst

Tris(tetrabutylammonium) decavanadate of formula $[N(C_4H_9)_4]_3 \cdot H_3V_{10}O_{28}$ is prepared by reacting cyclohexyl orthovanadate and tetrabutylammonium hydroxide by the method of Jahr. et. al., Ber. 101 482 (1968).

Isomerisation

A mixture of 20 g. of dehydrolinalool and 0.15 g. of the decavanadate prepared above is heated at 150°C. for 2 hours. On following the previous procedure, citral is obtained with a degree of conversion of 26% and a yield, based on converted material, of 67%.

EXAMPLE 14

20 g. of dehydrolinalool, 0.312 g. of cyclohexyl orthovanadate prepared as in Example 1, 1 g. of cyclohexanol and 50 cm³ of Vaseline oil defined in Example 1 are introduced into a 150 cm³ flask fitted with a stirrer, a thermometer and a reflux condenser. The mixture is heated to 120°C. A stream of nitrogen charged with traces of ammonia by skimming concentrated aqueous ammonia and drying over CaO is bubbled into the reaction medium at the rate of 2 liters/hour. This bubbling and heating at 120°C., is continued for 30 minutes. The temperature is then raised to 160°C. within 15 minutes while nitrogen without ammonia is bubbled through, and kept at this figure for a further 45 minutes. The dehydrolinalool and the citral formed are distilled in vacuo. 20 g. of dehydrolinalool are introduced into the distillation residue and the mixture heated to 160°C. for 30 minutes in a dry atmosphere and distilled. 9 Recycling processes are thereafter carried out in this way. Citral is thus obtained in a yield of 75% based on converted material and with a degree of conversion of 22%.

EXAMPLE 15

40 g. of dehydrolinalool, 0.2 g. of ammonium metavanadate, 2 g. of cyclohexanol and 78.9 g. of squalane are introduced into a 500 cm³ flask fitted with a dropping funnel, a stirrer unit, a dip tube and a reflux head. In a first stage, the catalyst is prepared in the following manner. Nitrogen is bubbled through at the rate of 4 liters/hour and the mixture heated to 160°C. for 1 hour. The cyclohexanol, the dehydrolinalool and the citral are distilled in vacuo without exceeding 130°C., in the reaction mixture.

An isomerisation process is then carried out continuously in the following manner. 10 cm³ of dehydrolinalool are added, the mixture heated to 160°C., and the pressure reduced until a reflux is obtained (about 80 mm. Hg.). After 20 minutes' heating at this temperature, part of the refluxing liquid is distilled at the rate of 18 g./hour at the same time as dehydrolinalool is fed into the flask at the same rate. 44 g. of a distillate containing 7.62 g. of citral are thus collected, representing a yield of 48% based on converted material and a degree of conversion of 31%.

EXAMPLE 16

Preparation of the catalyst

An aqueous solution of potassium hexahydrobenzoate is prepared by running a solution of potassium hydroxide (0.2 mol in 30 cm³ of water) into a suspension of hexahydrobenzoic acid (0.2 mol in 100 cm³ of water). An aqueous solution of vanadyl sulphate (0.1 mol in 40 cm³ of water) is gradually added to this solution. The chestnut-coloured precipitate of vanadyl hexahydrobenzoate which is obtained is filtered off, suction-dried, washed with acetone, and then dried.

Isomerisation

A mixture of 4.35 g. of dehydrolinalool and 0.10 g. of vanadyl hexahydrobenzoate is heated to 130°C. for 2 hours 10 minutes in a flask fitted with a stirrer and a condenser. The reaction mixture is filtered and then distilled in vacuo. 3.80 g. of a fraction boiling between 45° and 55°C. under 0.2 mm.Hg. are collected. This fraction contains 0.65 g. of citral. The yield of citral based on dehydrolinalool converted is 54%, and the degree of conversion is 27%.

EXAMPLE 17

Preparation of the catalyst

Vanadyl acetate is prepared from $VOCl_3$ and acetic acid by the method of Paul et al. [J. Inorg. Nucl. Chem. 27 2537 (1965)].

Isomerisation

A mixture of 4.35 g. of dehydrolinalool and 0.10 g. of vanadyl acetate is heated to 130°C. for 2 hours 15 minutes in a flask fitted with a stirrer unit and a condenser. The reaction mixture is thereafter filtered and the filtrate distilled in vacuo. 3.55 g. of a fraction boiling between 40° and 60°C. under 0.2 mm.Hg. are collected. This fraction contains 0.81 g. of citral. The yield of citral based on dehydrolinalool converted is 50%, and the degree of conversion is 37%.

EXAMPLE 18

Preparation of the Catalyst

Vanadyl benzoate is prepared from $VOCl_3$ and benzoic acid in boiling carbon tetrachloride by the method of Prasad et al [J. Ind. Chem. Soc. 38 163 (1961)].

Isomerisation

A mixture of 4.35 g. of dehydrolinalool and 0.1 g. of vanadyl benzoate is heated to 130°C., for 2 hours 30 minutes in a flask fitted with a stirrer and a condenser. The reaction mixture is filtered and the filtrate is distilled in vacuo. 3.55 g. of a fraction boiling between 40° and 55°C. under 0.2 mm.Hg. are collected. This fraction contains 0.60 g. of citral. The yield of citral based on dehydrolinalool converted is 43%, and the degree of conversion is 32%.

EXAMPLE 19

Preparation of the Catalyst

Vanadyl stearate is prepared from 0.2 mol of stearic acid, 0.2 mol of potassium hydroxide and 0.1 mol of vanadyl sulphate by a procedure similar to that described in Example 16.

Isomerisation

A mixture of 4.35 g. of dehydrolinalool and 0.20 g. of vanadyl stearate is heated to 130°C. for 3 hours 45 minutes in a flask fitted with a stirrer and a condenser. The reaction mixture is filtered and then distilled in vacuo. 3.40 g. of a fraction boiling between 40° and 55°C. under 0.2 mm.Hg. are collected. This fraction contains 0.58 g. of citral. The yield of citral based on dehydrolinalool converted in 38%, and the degree of conversion is 35%.

EXAMPLE 20

Preparation of the Catalyst 15 cm³ if aqueous ammonia (20% $NH_3$) are run with stirring into a mixture of 11.3 g. of $VOSO_4.3.5H_2O$, 100 cm³ of distilled water, and 11.3 cm³ of acetylacetone. A pH of 9 results. The mixture is stirred for 1 hour at ambient temperature and filtered. The precipitate is washed with 100 cm³ of distilled water and dried to constant weight. Vanadyl acetylacetonate $VO(C_5H_7O_2)_2$ is obtained.

Isomerisation 1 cm³ of dehydrolinalool and 0.05 g. of vanadyl acetylacetonate are introduced into a 50 cm³ flask fitted with a condenser. The mixture is heated to 170°C. with stirring. 4 cm³ of dehydrolinalool (making a total of 4.3 g. of dehydrolinalool) are then run in over the course of 12 minutes. The mixture is heated for a further 25 minutes, cooled, filtered, and distilled. 3.3 g. of a fraction boiling between 33° and 62°C. under 0.1 mm.Hg. and containing 0.76 g. of citral are collected. The yield of citral based on dehydrolinalool converted is 41%, and the degree of conversion is 43%.

EXAMPLE 21

Preparation of the Catalyst (vanadium oxide deposited on alumina)

3.7 g. of $V_2O_5$ and 18.5 g. of water are mixed in an Erlenmeyer flask. The mixture is heated to 90°C., and 13 g. of oxalic acid are gradually added. The intense blue solution is poured on to 71 g. of alumina which has beforehand been heated to 550°C. for 16 hours. The mixture is stirred and evaporated to dryness. The residue is heated for 16 hours at 380°C., and then for 2 hours at 700°C., and ground in a mortar. A yellowish-brown powder which is the catalyst is thus obtained. It contains 2.8% by weight of vanadium metal.

Isomerisation

A mixture of 4.35 g. of dehydrolinalool and 0.36 g. of the catalyst prepared above is heated to 130°C. for 4 hours 30 minutes in a flask fitted with a stirrer and a condenser. The reaction mixture is filtered and the insoluble fraction is washed with acetone. This acetone is combined with the filtrate, which is distilled in vacuo. 3.5 g. of a fraction boiling between 45° and 65°C., under 0.2 mm.Hg. are obtained, and analysed by gas phase chromatography. The yield of citral based on dehydrolinalool converted is 30%, and the degree of conversion is 28%.

EXAMPLE 22

20 g. of dehydrolinalool, 0.1 g. of ammonium molybdate of formula $(NH_4)_6 MO_7O_{24}.4H_2O$ (sold commercially by Prolabo), 1 cm³ of cyclohexanol and 20 g. of Vaseline oil (defined in Example 1) are introduced into a 100 cm³ flask fitted with a stirrer and a thermometer, in a dry atmosphere. Nitrogen is bubbled into the medium at the rate of 2 liters/hour to remove the greater part of the ammonia formed. The temperature is raised to 170°C., in 15 minutes and kept at this figure for 15 minutes. The reaction mixture is distilled in vacuo. 20.2 g. of a fraction boiling between 48° and 66°C., under 0.4 mm.Hg. and containing 1.4 g. of citral are collected. The yield of citral based on dehydrolinalool converted is 34%, and the degree of conversion is 20.5%.

20 g. of dehydrolinalool are introduced into the distillation residue. Nitrogen is bubbled through, the mixture stirred, and the temperature raised to 170°C., and kept at this figure for 15 minutes. The mixture is cooled. On distillation, a fraction weighing 19.2 g. is collected.

A third isomerisation process identical to the preceding process is carried out. The total of the three fractions yields citral in a degree of conversion of 18.1% and in a yield based on converted material of 45.9%.

EXAMPLE 23

Preparation of the Catalyst

A mixture of 10 g. of $MoO_3$ and 50 cm³ of acetylacetone is heated under reflux for 23 hours. The mixture is filtered hot and 3.85 g. of a pale blue solid which is the catalyst are thus obtained.

Isomerisation 5 cm³ dehydrolinalool and 0.05 g. of the catalyst are introduced into a 50 cm³ flask fitted with a condenser. The mixture is heated with stirring for 2 hours 45 minutes at 165°C. The mixture is cooled, filtered, and the filtrate distilled. 3.05 g. of a fraction boiling between 50° and 80°C. under 1 mm.Hg. and containing about 20% of citral are collected.

EXAMPLE 24

Preparation of the Catalyst

A suspension of 1 g. of $MoO_3$ and 50 cm³ of propanol is heated to reflux for 8 hours. The mixture is filtered and the filtrate evaporated to dryness. A deep green solid is obtained.

Isomerisation

A mixture of 2.6 g. of dehydrolinalool and 32 mg. of the catalyst is heated to 130°C. for 3 hours 10 minutes in a flask fitted with a stirrer and a condenser. 1.9 g. of a fraction boiling between 40° and 55°C., under 0.6 mm.Hg. and containing 0.24 g. of citral are obtained. The yield of citral based on dehydrolinalool converted is 25%, and the degree of conversion is 36%.

EXAMPLE 25

Preparation of the Catalyst

Ammonium perrhenate is prepared by oxidising rhenium to perrhenic acid and then converting this acid into the ammonium salt. 1.058 g. of rhenium powder (sold commercially by Prolabo) are introduced into a 50 cm³ flask fitted with a stirrer, a thermometer and a reflux condenser. 10 cm³ of 130 volume hydrogen peroxide are added dropwise over the course of 15 minutes with stirring. The flask is externally cooled by a stream of water at ambient temperature during this addition. After the addition the mixture is stirred for a further 10 minutes. 0.2 cm³ of concentrated hydrochloric acid ($d = 1.19$) are added and the mixture heated on a boiling water bath for 30 minutes and then cooled. 5 cm³ of ammonia ($d = 0.925$) are added and this precipitates ammonium perrhenate. The product is filtered on a sintered glass filter and dried in vacuo to constant weight. 1.11 g. of a product containing 83.6% of ammonium perrhenate are obtained.

Isomerisation 10 g. of dehydrolinalool, 0.1 g. of ammonium perrhenate and 0.5 cm³ of cyclohexanol are introduced into a 100 cm³ flask fitted with a stirrer, a thermometer and a reflux condenser. Nitrogen is bubbled through at 2 liters/hour to remove the greater part of the ammonia formed. The temperature is raised to 170°C. within 5 minutes and kept at this figure for 10 minutes. The reaction mixture is distilled in vacuo. 9.25 g. of a fraction boiling between 45° and 81°C. under 0.62 mm.Hg. are collected. 10 g. of dehydrolinalool are added to the distillation residue. The mixture is heated to 170°C. over the course of 5 minutes and the temperature kept at this figure for a further 5 minutes. 9.25 g. of a fraction similar to the first are collected by distillation. 10 g. of dehydrolinalool are again added to the distillation residue. The temperature is raised to 170°C. over the course of 5 minutes and kept at this figure for a further 5 minutes. 9.25 g. of a fraction similar to the preceding fractions are collected by distillation. The total of these three fractions contains 2.8 g. of citral. The yield of citral based on dehydrolinalool converted is 46.8%, and the degree of conversion is 20%.

EXAMPLE 26

Preparation of the Catalyst

The catalyst is prepared by reaction of hydrazine hydrochloride with perrhenic acid in the presence of triphenylphosphine by the method of Freni et al. (J. Inorg. Nucl. Chem. 16, 240 (1961)).

Isomerisation 2.58 g. of dehydrolinalool and 44 mg. of catalyst are introduced into a 50 cm³ flask fitted with a condenser and a stirrer unit. The mixture is heated to 180°C. with stirring, under a stream of dry air, for 30 minutes and then for 1 hour 30 minutes without a stream of air. The reaction mixture is distilled in vacuo. 0.6 g. of a fraction boiling between 35° and 60°C. under 0.8 mm.Hg. and containing 0.28 g. of citral are collected. The yield of citral based on dehydrolinalool converted is 12%, and the degree of conversion is 93%.

EXAMPLE 27

Preparation of the Catalyst

Niobium pentachloride $NbCl_5$ is prepared by the method of Hecht et al. (Z. Anorg. Chem. 254 260 (1947)) from $Nb_2O_5$ and $SOCL_2$.

Isomerisation

A mixture of 8.8 g. of dehydrolinalool, 0.428 g. of catalyst containing 147 mg. of niobium and 40 cm³ of Vaseline oil defined in Example 1 is heated for 3 hours at 140°C. in a dry atmosphere. After distillation, citral is obtained with a degree of conversion of 70.6% and in a yield of 5.9% based on the dehydrolinalool converted.

EXAMPLE 28

A mixture of 8.8 g. of dehydrolinalool, 0.752 g. of $WO_3$ (containing 596 mg. of tungsten, sold commercially by prolabo), and 50 cm³ of Vaseline oil (defined in Example 1) is heated for 3 hours at 140°C. The mixture is distilled and citral is obtained with a degree of conversion of 18.9% and in a yield of 45.5%, based on the dehydrolinalool converted.

EXAMPLES 29 to 32

Preparation of the Catalysts

Four tungstic esters of formula $WO(OR)_4$ in which R represents ethyl, 1,1-dimethylpropyl, cycloheexyl cyclehexyl benzyl, are prepared. These esters are prepared in two stages. In the first stage. $WOCl_4$ is prepared from $WO_3$ and $SOCl_2$ by the method of Hecht et al. (Z. Anorg. Chem. 254 255-264 (1947)). In the second stage, $WO(OR)_4$ is prepared from $WOCl_4$ and an alcohol R—OH by the method of Funk et al. (Z. Anorg. Chem. 304 349-240 (1960)).

Isomerisation

The same procedure as previously is followed. The Table below indicates the various reaction conditions and the results obtained. Yield designates the yield of citral based on dehydrolinalool converted.

| Example | Weight of dehydrolinalool in g. | Nature of the radical R | Weight of catalyst in g. | Weight in g. of tungsten in the catalyst | Amount of Vaseline oil in cm³ | Heating temperature in °C. | Duration of heating | Degree of Conversion | Yield |
|---|---|---|---|---|---|---|---|---|---|
| 29 | 8.8 | $C_2H_5$— | 0.610 | 0.288 | 50 | 130 | 1 hr. 30 mins. | 44% | 14% |
| 30 | 4.4 | $CH_3-CH_2-\underset{CH_3}{\overset{CH_3}{C}}-$ | 0.800 | 0.268 | 0 | 130 | 4 hrs. 30 mins. | 23% | 7.5% |
| 31 | 4.4 | cyclohexyl— | 0.560 | 0.172 | 25 | 140 | 2 hrs. 10 mins. | 57% | 7% |
| 32 | 4.4 | phenyl—$CH_2$— | 0.400 | 0.117 | 0 | 150 | 4 hrs. 00 mins. | 40% | 5% |

Example 33

10 g. of 3,7,11-trimethyl-dodeca-6,10-dien-1-yn-3-ol, 0.5 cm³ of cyclohexanol, and 0.05 g. of ammonium metavanadate (commercial product) are introduced into a 100 cm³ flask fitted with a thermometer, a stirrer and a reflux condenser. Nitrogen is bubbled through at the rate of 2 liters/hour to remove the greater part of the ammonia formed. The temperature is raised to 150°C. and kept at this figure for 3 hours. The mixture is cooled and filtered. The insoluble material is washed with 10 cm³ of diethyl ether, dried, and distilled. 7.2 g. of a fraction boiling between 100° and 110°C. under 1.5 mm. Hg are collected. The yield of 3,7,11-trimethyl-dodeca-2,6,10-trienal based on alcohol converted is 11%, and the degree of conversion is 31.6%.

EXAMPLE 34

5 g. of 2-methyl-3-nonyn-2-ol, 0.5 cm³ of cyclohexanol, and 0.05 g. of ammonium metavanadate (commercial product) are introduced into a 50 cm³ flask fitted with a thermometer, a stirrer and a reflux condenser. The procedure of Example 33 is followed. 4.2 g. of a fraction boiling between 98° and 101°C. under 19 mm.Hg are collected. The yield of 2-methyl-2-nonen-4-one based on alcohol converted is 80.8%, and the degree of conversion is 81.6%.

EXAMPLE 35

5 g. of 2-methyl-3-nonyn-2-ol, 0.1 g. of hydrated ammonium molybdate $(NH_4)_6MO_7O_{24}\cdot 4H_2O$ (commercial product), and 0.5 cm³ of cyclohexanol are introduced into a 50 cm³ flask fitted with a thermometer, a stirrer and a reflux condenser. The procedure of Example 33 is followed, heating for 1 hour 30 minutes instead of 3 hours. The yield of 2-methyl-2-nonen-4-one based on alcohol converted is 63%, and the degree of conversion is 85.6%

EXAMPLE 36

The procedure of Example 34 is followed, replacing the 2-methyl-3-nonyn-2-ol by 3-octyn-2-ol, and continuing the heating for 4 hours instead of 3 hours. 2.1 g. of a fraction boiling between 40° and 45°C. under 1 mm.Hg are collected. The yield of 2-octen-4-one based on alcohol converted is 75% and the degree of conversion is 56%.

EXAMPLE 37

4 g. of 4-phenyl-2-methyl-3-butyn-2-ol, 16 cm³ of Vaseline oil (defined in Example 1), and 0.08 g. of cyclohexyl orthovanadate (prepared as in Example 1) are introduced into a 100 cm³ flask fitted with a stirrer, a thermometer and a reflux condenser. The mixture is heated under a dry atmosphere for 6 hours at 145°C. On distillation, 3.4 g. of a fraction boiling between 70° and 92°C. under 1 mm.Hg are collected. The yield of 4-phenyl-2-methyl-2-buten-4-one based on the alcohol introduced is 70%.

EXAMPLE 38

A mixture of 10 g. of 4,7-dimethyl-3-ethyl-6-octen-1-yn-3-ol, 0.1 g. of ammonium metavanadate (commercial product), and 1 cm³ of cyclohexanol is heated for 1 hour 15 minutes at 150°C. under a stream of nitrogen to remove the greater part of the the ammonia formed. 4,7-Dimethyl-3-ethyl-2,6-octadienal is obtained in a yield of 69.4% based on the converted material, with a degree of conversion of 36%.

EXAMPLE 39

10 g. of 3-methyl-1-nonyn-3-ol, 0.153 g. of cyclohexyl orthovanadate prepared as in Example 1, and 1 cm³ of cyclohexanol are introduced into a 100 cm³ flask fitted with a stirrer, a dip tube, a thermometer and a reflux condenser. The mixture is heated at 120°C. for 30 minutes while a stream of nitrogen charged with ammonia is bubbled into the reaction medium as in Example 14, at the rate of 2 liters/hour. The mixture is then heated for a further hour at 160°C. under a stream of nitrogen alone. 3-Methyl-2-nonenal is obtained in a yield of 63.3% based on material converted, with a degree of conversion of 44.2%.

EXAMPLE 40

A mixture of 10 g. of 7-methyl-3-isobutyl-6-octen-1-yn-3-ol, 0.1 g. of ammonium metavanadate (commercial product), and 1 cm³ of cyclohexanol is heated for 1 hour at 150°C. under a stream of nitrogen to remove the greater part of the ammonia formed. 7-Methyl-3-isobutyl-2,6-octadienal is obtained in a yield of 60% based on converted material, with a degree of conversion of 48%.

EXAMPLE 41

The procedure of Example 40 is followed, replacing the acetylenic alcohol by a mixture of 3,4,7-trimethyl-6-octen-1-yn-3-ol and 7-methyl-3-ethyl-6-octen-1-yn-3-ol in a weight ratio of 90/10. This mixture was prepared by reacting acetylene with the mixture of ketones arising from the condensation of methyl ethyl ketone with 3-methyl-1-chloro-2-butene. The mixture of aldehydes corresponding to the starting alcohols (3,4,7-trimethyl-2,6-octadienal and 7-methyl-3-ethyl-2,6-octadienal) is obtained in a degree of conversion of 41.2% and a yield based on converted material of 50.4%.

EXAMPLE 42

The procedure of Example 39 is followed, limiting the heating time at 160°C. to 30 minutes and replacing the acetylenic alcohol by a mixture of 3,7-dimethyl-4-ethyl-6-octen-1-yn-3-ol and 7-methyl-3-propyl-6-octen-1-yn-3-ol in the proportion of 2:1 by weight. This mixture was prepared by reacting acetylene with the mixture of ketones produced by condensation of n-propyl methyl ketone with 3-methyl-1-chloro-2-butene. The mixture of aldehydes corresponding to the starting alcohols (3,7-dimethyl-4-ethyl-2,6-octadienal and 7-methyl-3-propyl-2,6-octadienal) is obtained in a yield of 54.8% based on converted material, for a degree of conversion of 59.3%.

EXAMPLE 43

5 g. of 2,2,6-trimethyl-1-ethynyl-cyclohexanol, 0.5 g. of cyclohexyl orthovanadate prepared according to Example 1, and 20 g. of Vaseline oil (as defined in Example 1) are introduced into a 50 cm³ flask fitted with a stirrer, a thermometer and a reflux condenser. The mixture is heated in a dry atmosphere to 130°C. and then kept at this figure for 2 hours 30 minutes. The mixture is cooled and, on distillation, 2,2,6-trimethyl-cyclohexylidene-acetaldehyde is obtained in a yield of 13% based on converted material and (2,6,6-trimethyl-cyclohxen-1-yl)acetaldehyde is obtained in a yield of 78% based on converted material. The degree of conversion is 61.2%.

EXAMPLE 44

The procedure of Example 42 is followed, but replacing the mixture of acetylenic alcohols by 2-(3-methyl- 2-buten-1-yl)-1-ethynylcyclohexanol. A mixture of the following two aldehydes is obtained with a degree of conversion of 26% and a yield based on converted material of 23% of 2-(3-methyl-2-buten-1-yl)cyclohexylidene-acetaldehyde and [6-(3-methyl-2-buten-1-yl)cyclohexen-1-yl]acetaldehyde.

EXAMPLE 45

10 g. of a mixture of 3,4,4,7-tetramethyl-6-octen-1-yn-3-ol and 7-methyl-3-isopropyl-6-octen-1-yn-3-ol in a weight ratio of 85:15 (this mixture being produced by ethinylation of a mixture of ketones prepared by condensation of isopropyl methyl ketone and 3-methyl-1-chloro-2-butene) and 0.1 g. of cyclohexyl orthovanadate prepared as in Example 1 are introduced into a 50 cm³ flask fitted with a stirrer unit, a thermometer, a dip tube and a reflux condenser. The mixture is heated for 2 hours at 130°C. in a dry atmosphere, cooled and distilled. A mixture of 3,4,4,7-tetramethyl-2,6-octadienal and 7-methyl-3-isopropyl-2,6-octadienal is obtained with a degree of conversion of 23.6% and in a yield based on converted material of 28.3%.

EXAMPLE 46

Preparation of the Catalyst (tetrahydrolinalyl orthovanadate)

10 g. of ammonium metavanadate and 100 cm³ of 3,7-dimethyloctan-3-ol are introduced into a 250 cm³ flask fitted with a stirrer, a dip tube and a reflux head. Nitrogen is bubbled into the medium at the rate of 6 l./hour. The mixture is heated for 2 hours at 150°C., water and ammonia being removed at the rate at which they are formed. The mixture is diluted with 100 cm³ of cyclohexane, 1 g. of active vegetable charcoal is added, and the mixture is heated for 1 hour under reflux and filtered. The cyclohexane and the excess dimethyloctanol are removed by distillation of the filtrate. The residue is further heated for 30 minutes at 100°C. under 0.2 mm.Hg. 45.9 g. of pure tetrahydrolinalyl orthovanadate of formula:

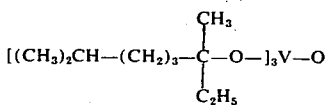

are obtained as a distillation residue.

Isomerisation 20 g. of dehydrolinalool, 0.54 g. of the catalyst and 50 cm³ of the Vaseline oil defined in Example 1 are introduced into a 150 cm³ flask fitted with a magnetic stirrer, a dip tube, and a Vigreux column. The mixture is heated for 25 minutes at 160°C. in a dry atmosphere. The resulting mixture of dehydrolinalool and citral is distilled under 0.1 mm.Hg. A further 20 g. of dehydrolinalool are added to the distillation residue and the mixture heated for 30 minutes at 160°C. in a dry atmosphere. 8 recycling processes are then carried out in this way, making a total of 9 isomerisation processes. 29.14 g. of citral are obtained, representing a yield of 69.8% based on the dehydrolinalool converted, for a degree of conversion of 23%.

EXAMPLE 47

20 g. of dehydrolinalool, 0.364 g. of cyclohexyl orthovanadate prepared as in Example 1, 0.149 g. of triethanolamine, 1 g. of cyclohexanol and 50 cm³ of Vaseline oil defined in Example 1 are introduced into a 150 cm³ flask fitted with a stirrer and a Vigreux column. The reaction mixture is heated in a dry atmosphere for 30 minutes at 120°C. and then for 30 minutes at 160°C., and is then distilled. 20 g. of dehydrolinalool are added to the distillation residue and the mixture heated to 160°C. for 30 minutes in a dry atmosphere. The mixture is distilled and a third isomerization process is begun. 11.53 g. of citral are thus obtained, representing a yield of 73% based on converted material for a degree of conversion of 26%.

EXAMPLE 48

Preparation of the Catalyst

Triethanolamine orthovanadate of formula:

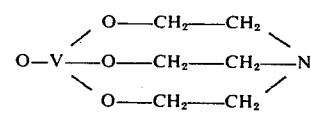

is prepared by reaction of triethanolamine with cyclohexyl orthovanadate by the method of Mittal (Z. Anorg. Allg. Chem. 351 310 (1967)).

Isomerisation 20 g. of dehydrolinalool, 0.219 g. of the catalyst, and 50 cm³ of Vaseline oil defined in Example 1 are introduced into a 150 cm³ flask fitted with a stirrer and a Vigreux column. The reaction mixture is heated for 30 minutes at 160°C. in a dry atmosphere and then distilled. 20 g. of dehydrolinalool are added to the distillation residue and the mixture again heated for 30 minutes at 160°C. in a dry atmosphere, and distilled. 9.16 g. of citral are finally obtained, representing a yield of 73% based on converted material, for a degree of conversion of 31%.

EXAMPLES 49–53

20 g. of dehydrolinalool, 0.272 g. of tetrahydrolinalyl orthovanadate (prepared as in Example 46), and a Lewis base; (in quantity and kind as specified below) are heated together in a 50 cm³ round bottomed flask, provided with a stirrer and a Vigreux column, for 30 minutes at 160°C. in a dry atmosphere. The reaction mixture is then distilled. 20 g. of dehydrolinalool are then added to the distillation residue and heated for 30 minutes at 160°C. in a dry atmosphere. The reaction mixture is distilled. A third isomerisation process identical to the second is then carried out.

The following Table gives the nature and weight of the Lewis bases used, the yield of citral based on dehydrolinalool converted, and the degree of conversion of the dehydrolinalool. ($C_6H_5$ is phenyl and $C_6H_{11}$ is cyclohexyl).

| EXAMPLE | LEWIS BASE | | YIELD | DEGREE OF CONVERSION |
|---|---|---|---|---|
| | Nature | Weight in mg. | | |
| 49 | $(C_6H_5)_3As$ | 153 | 71.4 | 23.6 |
| 50 | $(C_6H_5)_3Sb$ | 181 | 61.9 | 25.5 |
| 51 | $(C_6H_5)_3Bi$ | 223 | 63.8 | 23.0 |
| 52 | $(C_6H_5)_3P$ | 132 | 60.4 | 25.8 |
| 53 | $(C_6H_{11})_3P$ | 140 | 68.5 | 26.4 |

We claim:
1. A process for the preparation of ethylenic carbonyl compounds of the formulae:

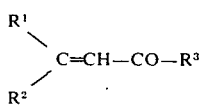

and the tautomers thereof, comprising heating in the liquid phase an acetylenic alcohol of the formulae:

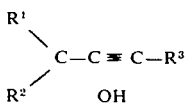

in the presence of a catalyst of a compound of a transition metal selected from the group consisting of vanadium, niobium, molybdenum, tungsten and rhenium, and wherein $R^1$, $R^2$ and $R^3$ are inert under the conditions of the process and are selected from the group consisting of hydrogen, aliphatic, cycloaliphatic, arylaliphatic and aromatic radicals, and wherein $R^1$ and $R^2$ together may represent a divalent aliphatic radical of 3 to 12 carbon atoms and make with the carbon atom to which they are attached a carbocyclic ring, the divalent radicals being either saturated or containing double bonds, and wherein the aliphatic, cycloaliphatic, arylaliphatic or aromatic radicals may be substituted by halogen, hydroxy, alkoxy, acyl or acyloxy substituents.

2. Process according to claim 1 wherein at least one of $R^1$ or $R^2$ has 1 to 15 carbon atoms.

3. Process according to claim 2 wherein the compound of the transition metal is selected from the group consisting of the halides, chalcogenides, chelates, coordination complexes, alcoholates, oxygen-containing inorganic acid salts of said metals, aliphatic, cycloaliphatic and aromatic organic acid salts of said metals, and the salts and esters of acids derived from said metals.

4. Process according to claim 2 wherein the catalyst is a uanadate.

5. Process according to claim 2 where the reaction products are distilled at a rate at which the reaction products are formed.

6. Process according to claim 2 wherein at the end of the reaction, the catalyst is recovered and re-used in a fresh isomerization reaction.

7. Process according to claim 1 in which $R^1$, $R^2$ and $R^3$ in total contain between 3 and 30 carbon atoms.

8. Process according to claim 1, in which $R^1$ is an unsubstituted acyclic aliphatic radical of up to 12 carbon atoms which is saturated or contains one or two double bonds, $R^2$ is alkyl of up to 6 carbon atoms, or $R^1$ and $R^2$ together represent a divalent aliphatic radical of 3 to 12 carbon atoms which is saturated or contains one or two double bonds and made with the carbon atoms to which they are attached a 5 or 6 membered carbocyclic ring, and $R^3$ is hydrogen, alkyl of up to 6 carbon atoms, or phenyl.

9. Process according to claim 1 in which the said acetylenic alcohol is dehydrolinalool, and the product is citral.

10. Process according to claim 1 in which the catalyst contains a group of one of the following formulae:

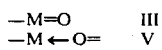   III   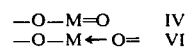   IV
—M←O=   V   —O—M←O=   VI where M represents V, Nb, Mo, W, or Re.

11. Process according to claim 2 in which the catalyst is a metallic oxide, a metallic salt, an ester of an oxyacid derived from said metal, a salt of an oxygen-containing metal ion, or a chelate derived from a β-diketone.

12. Process according to claim 11 in which the said catalyst is an ammonium vanadate, a vanadyl salt, or a lower alkyl orthovanadate.

13. Process according to claim 11 wherein the catalyst is an ester of an oxyacid derived from said metal.

14. Process according to claim 2 in which the catalyst is deposited on a carrier.

15. Process according to claim 2 in which the proportion of catalyst is 0.0001 to 2% of the reaction mass.

16. Process according to claim 27 in which the proportion is from 0.05 to 2% of the reaction mass.

17. Process according to claim 2 in which the catalyst is combined with an amount of an alcohol or Lewis base or compound capable of liberating such a Lewis base under the reaction conditions.

18. Process according to claim 17 in which the Lewis base is ammonia, an amine, phosphine, arsine, stibine bismuthine or an ammonium salt.

19. Process according to claim 2 in which the reaction temperature is from 50° to 250°C.

20. Process according to claim 19 in which the reaction temperature is from 100° to 200°C.

21. Process according to claim 2 in which the reaction medium contains a solvent and/or a co-catalyst.

22. Process according to claim 21 in which the solvent is a hydrocarbon.

* * * * *

UNITED STATES PATENT OFFICE
CERTIFICATE OF CORRECTION

Patent No. 3,920,751    Dated November 18, 1975

Inventor(s) Pierre Chabardes; Yvon Querou

It is certified that error appears in the above-identified patent and that said Letters Patent are hereby corrected as shown below:

In the heading:

Please add

--[30]  Foreign Application Priority Data
          Nov. 28, 1967    France...130,019--

In Column 1 line 20, and Column 2 line 1, in the formula replace the double bond by a triple bond.

In Column 17 line 45, and Column 18, line 20, in the formula insert a double bond between the oxygen and the vanadium atoms.

Claim 1, column 19 line 15, insert a valence link between the hydroxyl group and the left-hand carbon atom to read:

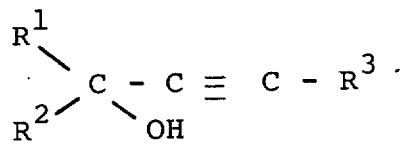

Claim 4, column 19 line 45, correct to read "vanadate".

Signed and Sealed this

Twentieth Day of July 1976

[SEAL]

Attest:

RUTH C. MASON
*Attesting Officer*

C. MARSHALL DANN
*Commissioner of Patents and Trademarks*